3,141,036
CYCLOHEXANE CARBOXYLIC ACID PRODUCED BY HYDROGENATION OF MOLTEN BENZOIC ACID

Leon O. Winstrom, East Aurora, N.Y., and Orvill E. Snider, Petersburg, Va., assignors to Allied Chemical Corporation, New York, N.Y., a corporation of New York
No Drawing. Filed July 27, 1961, Ser. No. 127,140
7 Claims. (Cl. 260—514)

This invention relates to an improved process for the preparation of cyclohexane carboxylic acid. More particularly it relates to the hydrogenation of benzoic acid to cyclohexane carboxylic acid in the presence of a hydrogenating metal catalyst.

The catalytic hydrogenation of benzoic acid in the presence of solvents to cyclohexane carboxylic acid is well known. These processes however are characterized by disadvantages to use on a large scale. Thus, for example, solvents such as methanol result in the formation of esters which must be carefully removed in order to avoid contamination of the desired free acid product. Higher alcoholic solvents are not only relatively difficult to separate from the cyclohexane carboxylic acid (M.P. 31° C.) but also may be relatively expensive. Acidic solvents such as acetic acid are difficult to recover, present a serious waste disposal problem and also may be relatively expensive. Basic solvents such as aqueous alkali cause decarboxylation and poor yields.

The prior art procedures also generally require relatively high pressures and/or high temperatures and further are not productive of optimum yields of cyclohexane carboxylic acid.

An object of the present invention is to provide an improved process for hydrogenating benzoic acid to cyclohexane carboxylic acid.

A further object is to provide a process for hydrogenating molten benzoic acid as the reaction medium in the presence of a hydrogenating metal catalyst at low pressures.

A still further object is to provide an improved process for the catalytic hydrogenation of benzoic acid which is rapid, efficient and economical.

Other objects will appear hereinafter.

In accordance with the present invention, cyclohexane carboxylic acid is produced by reacting molten benzoic acid, while subjecting it to agitation, with hydrogen in the presence of a metal hydrogenating catalyst at temperatures within the range of from above the melting point of the acid to about 250° C. The process permits use of relatively low pressures of from about atmospheric to about 100 atmospheres, although higher pressures may also be employed. Substantially quantitative and selective conversion of the benzoic acid is effected with the resultant product being essentially cyclohexane carboxylic acid.

We have made the surprising discovery that benzoic acid can be hydrogenated rapidly and completely without the use of solvents provided the benzoic acid is maintained in the molten state. This discovery is important since the use and recovery of organic solvents on a commercial scale is expensive, troublesome and may be hazardous. Furthermore, hydrogenating metal catalysts of the type suitable for use in our novel process are often pyrophoric in nature. The use of such catalysts in the presence of a flammable organic solvent, e.g., methanol, presents an appreciable hazard.

We have found that the rate of agitation of the molten benzoic acid-catalyst mixture affects the rate of hydrogenation. Thus in an experiment in which 1000 parts of benzoic acid (distilled) was admixed with 3.5% by weight of 5% palladium-on-charcoal catalyst and hydrogenated at 180° C. and 40 atmospheres pressure, complete reduction was obtained in ½ hour when the mass was agitated by means of an impeller type agitator revolving at 1300 r.p.m. When a similar mixture was hydrogenated using a conventional splasher type agitator but otherwise under similar conditions, the absorption of hydrogen ceased when about 60% of the theoretical amount of hydrogen had been absorbed. Complete hydrogenation was obtained in one hour by increasing the catalyst concentration to 5% and the pressure to about 100 atmospheres. Accordingly, we prefer to carry out this process while vigorously agitating the molten mixture.

The hydrogenating metal catalysts and methods of preparing them are well known. Of these palladium, platinum, rhodium, ruthenium, their oxides and salts prepared by methods well known in the art are preferred. We especially prefer to use palladium catalysts. As customary in the art, such catalysts are generally used in the form of supported catalysts, i.e., the catalyst substance is dispersed or absorbed on the surface of an inert material, such as charcoal, aluminum oxide, calcium carbonate, barium sulfate or the like porous substances. The concentration of the metal catalyst in the catalyst support is not critical and is usually in the range of about 1% to about 10% of the weight of the catalyst mixture. A satisfactory and commercially available catalyst contains 5% of palladium on charcoal support. The amount of catalyst used in the hydrogenation also is not critical and can vary from about 0.025 to 10% or more of the weight of benzoic acid used. Preferably from about 1.0 to 5% of catalylst containing 5% palladium on charcoal support is used.

The temperature at which the hydrogenation is run can be varied over a broad range. The minimum temperature, of course, will be determined by the melting point of the benzoic acid reaction medium used. Pure benzoic acid melts at 122° C., although some commercially available grades melt as low as 120° C. and mixtures of benzoic acid and hydrogenated benzoic acids melt still lower. Preferably, the minimum temperature used should be 125° C. The maximum temperature will depend upon the pressure used, since it is essential to maintain the benzoic acid reaction medium in a liquid condition. As a matter of practical operation, a temperature in excess of 250° C. will rarely be used, and in fact we have found it convenient to use a temperature between 160° and 200° C., which represents our preferred operating range. Higher temperatures can be used but the improvement in reaction rate is so slight as not to compensate for the additional effort and expanse required to obtain and maintain such higher temperature. Lower temperatures can also be used but the reaction rate is progressively decreased as the temperature is lowered.

The pressure of the hydrogenation reaction can be varied over a wide range also. We have found that comparatively low superatmospheric pressures, of the order of about 1 to 40 atmospheres, are satisfactory both from the view of effectiveness and convenience. High pressures of 50 to 100 atmospheres or more can be used but here, as in the instance of high temperatures, the improvement in reaction rate is ordinarily not sufficient to compensate for the additional effort and expense required to obtain such higher pressures.

The improved process can be carried out in either batchwise or continuous fashion. The equipment used is that which is usual in such processes and obvious to those skilled in this art. Thus batchwise hydrogenation can be carried out in a vertical cylindrical pressure vessel equipped with an efficient agitator (preferably of the impeller type) and a suitable gas diffusion device at or near the bottom of the vessel. Heating and cooling is provided by means of interior coils or a vessel jacket. An inlet for benzoic acid and catalyst dispersed therein is provided at or near the vessel bottom. A vent is provided at or near the top of the vessel for discharge of unconsumed hydrogen or inert gas if used. A suitable pressure regulating device is inserted in the vent. For continuous operation, several such vessels are connected in series by means of overflow discharge ports located at preselected levels to permit control over residence time and hence product conversion in each vessel. For batch operation, a dip leg, preferably at or near the bottom of the vessel is provided for product withdrawal. A heated filter press for removing catalyst from the product or alternatively a settling chamber can be provided.

The presence of impurities such as sulfur, halogens, soluble iron and the like in substantial amounts has a deleterious effect on the rate of reduction. The effect of such impurities, we have found, can be obviated by treating the benzoic acid with ethylenediaminetetraacetic acid, or preferably an alkali metal salt of ethylenediaminetetraacetic acid in the presence of a similar quantity of an alkali metal hydroxide, at a temperature above the melting point of the crude benzoic acid for at least one hour and thereafter distilling benzoic acid from the mixture. The resultant treated benzoic acid is then in a preferred state for hydrogenation in accordance with our invention. The catalyst used can be recovered and reused a number of times without any substantial loss in efficiency. Such an advantage could not be obtained when using benzoic acid of commerce, except in isolated instances.

The conditioning of reducible cyclic organic compounds by treatment thereof with an ethylenediaminetetraacetic acid compound is disclosed and claimed in copending U.S. application S.N. 93,868, filed March 7, 1961, of Duggan and Winstrom.

It has been found that when operating under preferred conditions using benzoic acid conditioned as indicated above, and charcoal-supported palladium catalyst, the consumption of the latter is held to surprisingly low figure, and the catalyst can be recovered and recycled almost repeatedly. In one batchwise series of runs in which 3.5% by weight of benzoic acid of a 5% palladium/charcoal catalyst was used at 180° C. and at pressures between 20 and 40 atmospheres, the catalyst was recycled six times without any appreciable change in product quality, yield or reaction rate.

The following examples illustrate the process of our invention. Parts and percentages are by weight and temperatures are given in degrees centigrade.

*Example I*

A mixture of 1000 parts of distilled benzoic acid and 35 parts of 5% palladium-on-charcoal catalyst (sold by Engelhard Industries, Inc. as type M-178) was heated to 180° C. in a stainless steel jacketed autoclave. The mass was agitated by means of high speed partially shrouded turbine impeller rotating at 1300 r.p.m. Hydrogen was admitted through a diffuser located at the bottom of the autoclave just below the agitator and at a rate sufficient to attain and maintain a pressure of 40 atmospheres. After 30 minutes the theoretical amount of hydrogen had been absorbed and the hydrogenation ceased. Thereafter the mixture was discharged through a heated filter to remove dispersed catalyst. A practically quantitative yield of cyclohexane carboxylic acid was obtained.

The catalyst filtered from the hydrogenation mass was returned to the autoclave and admixed therein with a 1000 part quantity of molten benzoic acid. The mixture was hydrogenated as described above, but at a lower pressure of 20 atmospheres. This procedure was repeated six times and in each instance the theoretical amount of hydrogen necessary to convert the benzoic acid to cyclohexane carboxylic acid was absorbed in 30 minutes or less. The quality and yield of the resultant cyclohexane carboxylic acid were excellent and the catalyst showed no sign of deactivation.

Repetition of this procedure but using an autoclave equipped with a plunger type agitator of 140 cycles per minute, using 50 parts of catalyst and a pressure of about 100 atmospheres, gave an equivalent product after 60 minutes of reaction.

*Example II*

A mixture consisting of 4191 parts of technical benzoic acid, 11 parts of caustic soda and 11 parts of Sequestrene NA3 (trisodium salt of N,N,N',N'-ethylenediaminetetraacetic acid) was heated at 180° C. for about 2 hours and thereafter the mixture was distilled in vacuo to separate conditioned benzoic acid (B.P. 180°/68 mm.).

A mixture of 835 parts of the conditioned benzoic acid and 12.53 parts of 5% palladium-on-charcoal catalyst was heated to 180° in a stainless steel autoclave similar to that used in Example I above. The molten mass was vigorously agitated at 180°, as hydrogen was admitted through a diffuser located near the bottom of the vessel and at a rate such that the pressure was maintained at 70 p.s.i.g. After 5½ hours, hydrogen absorption had ceased completely and the molten mass was discharged from the vessel through a heated filter to remove dispersed catalyst. The product, cyclohexane carboxylic acid, was obtained in nearly quantitative yield (95%+heel left in vessel) and was of excellent quality (S.P. 30.3°). By comparison of the infra-red absorption of this product with that of a known sample of pure cyclohexane carboxylic acid, it was determined that the said product was 99.9% pure.

*Example III*

Repetition of the procedure of Example II but at 160° instead of 180° gave analogous results but required 7 hours instead of 5½ hours to complete the hydrogenation.

*Example IV*

In an experiment carried out as described above using 975 parts of benzoic acid conditioned as described above and 34.02 parts (3.5%) of 5% palladium-on-charcoal catalyst instead of 835 parts and 12.53 parts respectively, gave after only 3 hours, a practically quantitative yield of cyclohexane carboxylic acid of similar quality.

*Example V*

A mixture consisting of 900 parts of benzoic acid, conditioned with Sequestrene NA 3 and caustic soda as described in Example II above, 31.5 parts of 5% rhodium-on-charcoal catalyst was heated at 180° in an atmosphere of hydrogen while being agitated at 600 r.p.m. Hydrogen gas was fed into the stainless steel autoclave at a rate sufficient to maintain the contents thereof under a pressure of 150 p.s.i.g. After 9½ hours, hydrogen absorption had practically ceased and the reaction mass was discharged from the vessel through a heated filter to remove dispersed catalyst. The product, cyclohexane carboxylic acid, was obtained in pure state as indicated by its refractive index (1.4552 at 35°) and setting point (30.8°). The yield was practically quantitative.

*Example VI*

A mixture consisting of 955 parts of benzoic acid, conditioned as indicated in Example II above, and 33.43 parts of 5% palladium-on-silica gel was heated at 180° in an atmosphere of hydrogen under 70 p.s.i.g. pressure while being agitated at the rate of 600 r.p.m. After 7½ hours, the hydrogen absorption had ceased and the reaction mixture was discharge through a heated filter to remove catalyst. An excellent yield of pure cyclohexane carboxylic acid (refractive index=1.4552 at 35°, S.P. 30.6°) was obtained.

It can thus be seen that an improved and highly efficient novel process for the conversion of benzoic acid to cyclohexane carboxylic acid has been devised.

The above examples illustrate several specific embodiments of our invention and include the best known means for carrying it out. It will be obvious to those skilled in this art that various modifications in the specific details set out in these examples may be made without departing from the scope or spirit of our invention. For example, in place of palladium and rhodium, other hydrogenating metal catalysts such as ruthenium, platinum, and the like, can be used. Likewise, other inert porous materials than carbon such as silica, aluminum oxide, barium sulfate and the like can be used as catalyst supports. In place of hydrogen, gaseous mixtures containing hydrogen in admixture with one or more inert gases, as synthesis gas, can be used.

Our process provides a highly effective and economical procedure for the selective reduction of the benzene ring of benzoic acid. Solvents, which are relatively expensive to use and recover, are not required inasmuch as the molten benzoic acid provides the reaction medium. High pressures and high temperatures are not required, thus minimizing the complexity and cost of apparatus required. Moreover, as indicated above, since the yield and quality of cyclohexane carboxylic acid obtained are excellent and the consumption of catalyst is surprisingly small, our process is admirably suitable for the large scale manufacture of cyclohexane carboxylic acid.

Where in the above specification and in the appended claims, the term "molten benzoic acid" is used, it is intended to include not only pure benzoic acid in liquid form but also fluid mixtures thereof with hydrogenation products thereof, notably cyclohexane carboxylic acid. It will be obvious that such mixtures are inherently formed during the reduction of benzoic acid or even by adding pure benzoic acid to a reactor containing a "heel" of cyclohexane carboxylic acid from a preceding reduction. The said expression is intended also to include carrying out the reduction by a process in which a mixture of benzoic acid and cyclohexane carboxylic acid containing a predominating amount of the latter, is initially present. Thus such a mixture could be used initially when the novel process is carried out on a continuous basis, adding pure benzoic acid, or a mixture thereof with cyclohexane carboxylic acid, to the reduction vessel as the reaction proceeds.

We claim:

1. A process for producing cyclohexane carboxylic acid which consists in reacting molten benzoic acid with hydrogen in the presence of a metal hydrogenating catalyst at temperature above the melting point of the benzoic acid and pressure within the range of about 1 to 40 atmospheres and vigorously agitating the molten benzoic acid during the reaction whereby said benzoic acid is substantially entirely converted to cyclohexane carboxylic acid.

2. A process, as specified in claim 1, in which temperature within the range of about 125° C. to about 250° C. is employed.

3. A process, as specified in claim 1, in which temperature within the range of 160° C. to 200° C. is employed.

4. A process, as specified in claim 1, in which the benzoic acid prior to reaction with the hydrogen is treated by heating it above its melting point for at least one hour with a compound of the group consisting of ethylenediaminetetraacetic acid and alkali salts thereof and distilling the benzoic acid from the mixture.

5. A process, as specified in claim 1, in which the hydrogenating metal catalyst is a member of the group consisting of supported palladium catalyst, supported rhodium catalyst and supported ruthenium catalyst.

6. A process, as specified in claim 5, in which the catalyst is a supported catalyst comprising about 5% of palladium supported on charcoal.

7. A process for producing cyclohexane carboxylic acid from benzoic acid, said benzoic acid having been treated by heating it above its melting point for at least one hour with a compound of the group consisting of ethylene diaminetetraacetic acid and alkali salts thereof and distilling the benzoic acid from the mixture, which consists in reacting the benzoic acid in molten condition at temperature within the range of 160° C. to 200° C. and pressure within the range of about 1 to 40 atmospheres with hydrogen in the presence of palladium hydrogenating catalyst and vigorously agitating the molten benzoic acid during the reaction whereby said benzoic acid is substantially entirely converted to cyclohexane carboxylic acid.

References Cited in the file of this patent

UNITED STATES PATENTS

| 2,675,390 | Rosenblatt | Apr. 13, 1954 |
| 2,828,335 | Ferstandig et al. | Mar. 25, 1958 |
| 2,888,484 | Dehm et al. | May 26, 1959 |

OTHER REFERENCES

Ipatiew et al.: "Deutsche Chemische Gesellshaft, Berichte," vol. 59B, pages 306–311, 1926.

Martell et al.: "The Properties and Uses of Ethylenediamine Tetra Acid and Its Salts," 1949, page 11 relied on.

Versene Technical Bulletin No. 1, 1949, page 2.